United States Patent Office 3,307,601
Patented Mar. 7, 1967

3,307,601
CHEMICAL PEELING OF EDIBLE PLANT PRODUCTS
Otto T. Aepli, Southgate, Mich., assignor to Wyandotte Chemicals Corporation, Wyandotte, Mich., a corporation of Michigan
No Drawing. Filed July 21, 1965, Ser. No. 473,835
10 Claims. (Cl. 146—234)

This invention relates to a process and product for removing the outer layers of tissues from edible plant products. More specifically it relates to a process of removing the skins from fruits and vegetables by chemical action.

Lye peeling of fruits and vegetables has been used in the food processing industries for many years. A lye peeling process requires a generous water supply, caustic solution and a source of heat. The activity of the caustic solution for lye peeling is dependent upon the temperature, the concentration of the solution and the time of immersion. The temperature in the lower caustic solution concentration peeling should be held at or very close to the boiling point of the solution for effective peeling. The higher the temperature for a given caustic solution concentration, the greater the peeling power. For boiling or near boiling temperatures, the peeling power also increases with increasing caustic concentrations. As the concentration of the caustic solution increases, the boiling point of the solution rises. The peeling action of the caustic solution also increases in proportion to the time the edible plant is immersed in the lye bath. The three variables, solution temperature, lye concentration, and time of immersion, can be varied to suit any set of conditions in a particular operation.

With most fruits and vegetables, lye peeling can be accomplished. However, when these products are immersed in strong caustic solutions at temperatures from about 180° F. to 220° F. to obtain quick disintegration of the skin, deep penetration of the lye into the tissues of the edible plant products results and a disintegration of the penetrated tissues is produced. This is primarily due to the fact that upon immersion of the products into the caustic solution, the skin of the treated commodity is cracked, ruptured, destroyed or sloughed off irregularly so that the lye solution, instead of being confined to the skin, is brought into contact with the flesh of the fruit or vegetable and immediately attacks the tissues under the skin to a considerable degree. This results in a high loss of an otherwise edible product.

Waxy skinned fruits, as exemplified by the apple, require more rigorous physical or chemical treatment to remove the skin. When lye peeling is applied to apples, digestion of the skin proceeds very slowly at temperatures below 140° F. Raising the temperature of the lye solution increases the loss of flesh of the apple due to cooking and alkaline digestion beneath the skin. Holding an apple at a temperature of 160° F. or higher for more than a few minutes in a caustic solution causes a marked weakening of structure so that the apple tends to crumble with adverse results on subsequent handling and manipulation.

Furthermore, certain fruits and vegetables are discolored in the strong disintegrating bath, their flavor is changed, and it is difficult to remove the undersirable odor imparted by the solution. Careful and prolonged washing is therefore necessary to remove the odor and to improve the color of the product prior to further treatment and preservation thereof.

Application of the lye solution at or below the cooking temperature has been proposed. The contact time required, however, renders such an operation commercially impractical because the volume of the product undergoing treatment requires apparatus of impractical size.

It is therefore an object of this invention to provide a more economical and efficient product and method for removing the outer layers of tissues from edible plant products.

It is another object of this invention to provide a process that will substantially decrease the immersion time of the commodity to be peeled in the alkaline caustic solution.

It is still another object of this invention to provide a process for peeling fruits and vegetables which will substantially reduce the losses of edible flesh in the peeling of edible plant products by the action of alkaline caustic solutions thereon.

It is a further object of this invention to provide a peeling process in which the lye concentration can be diminished without reducing the peeling performance.

It is a still further object of this invention to provide a peeling process in which the temperature of the lye solution can be lowered without diminishing the peeling performance.

The present invention resides in the discovery that the addition of a small amount of a fatty acid having from 5 to 10 carbon atoms to the alkaline caustic solution in a lye peeling process can significantly enhance peeling performance. The three variables in a lye peeling process of time of immersion, lye concentration, and solution temperature can be varied to suit any set of conditions in a particular operation. The most significant variable is the time of immersion in the lye solution, which can be substantially decreased by the practice of this invention. By decreasing immersion time, the capacity of the equipment and consequently the volume of the product undergoing treatment can be greatly increased. This is especially important during the canning seasons when it is necessary to process large volumes of fruits or vegetables in a short time.

The compositions within the scope of this invention, for removing the outer layers of tissue from edible plant products comprise an aqueous solution containing from about 8 to 30 weight percent lye and from about 0.02 to to 1.00 percent, based on total solution, of a low molecular weight fatty acid. The compositions may also include small amounts of wetting agents or defoaming agents.

The fatty acids that may be used within the scope of this invention, have the general formula $C_nH_{2n}O_2$ where n is from 5 to 10. These acids include capric, pelargonic (also commonly called nonylic acid), caprylic, enanthic (also commonly called heptylic acid), caproic, valeric, 2-ethyl heptanoic acids and the isomers thereof. The molecular weights of these fatty acids range from about 102 to about 172. Fatty acids having more than about 10 carbon atoms are not suitable additives for the purposes of this invention. Fatty acids with more than 10 carbon atoms form gels at the lower operating temperatures with the lye solution. The gels float on top of the solution, thereby interfering with the peeling process.

According to the present invention, edible plant products are peeled by a process comprising the steps of contacting said products with an aqueous alkaline caustic solution containing a small amount of a fatty acid having from 5 to 10 carbon atoms under conditions of concentration, time and temperature sufficient to partially disintegrate the outer layers of tissue of said products without substantial damage to the remainder of said products; removing the wet products from contact with said solution; and rinsing said wet products in water to provide peeled edible plant products.

In the embodiments of this invention, the concentration of lye, e.g., sodium hydroxide or potassium hydroxide, in the solution may be varied over a wide range. For example, the lye concentration may be as low as about eight weight percent or as high as about 30 weight percent. The concentration of the fatty acid may be varied from about 0.02 weight percent to about 1.00 weight percent based on total solution.

If desired, a small quantity of any suitable wetting agent and/or defoamer may be added to the treating solution. Suitable wetting agents-defoamers include nonionic surfactants, such as a polyoxyethylene-polyoxypropylene block polymer. These surfactants are described in detail in U.S. Patent No. 2,674,619. Other suitable wetting agents-defoamers are the alkyl aryl polyethers as disclosed in U.S. Patent No. 2,913,416. Polyethoxylated alcohols as well as amine polyglycol condensates are examples of still other nonionic surfactants that can be employed. The silicone defoamers may also be used as additives to the treating solution. However, the silicone defoamers are added to the treating solution only if excess foaming occurs. The amount of nonionic surfactant actually added is that which is sufficient to give the desired wetting and/or defoaming action. It is generally in the range of 5 to 20 weight percent based on the total additives or in the range of 0.01 to 0.04 weight percent based on total solution.

The temperatures employed in the process of this invention can vary over a relatively wide range. Usually, the temperature ranges from about 130° F. up to the boiling temperature of the lye solution. The boiling temperature of each lye solution will depend upon the concentration of the lye solution but is usually not greater than about 220° F.

The time of immersion of the edible plant products to be peeled may also be varied over a wide range. For some products, the immersion time may be as little as 5 seconds. With products having skins that are difficult to remove it may be necessary to increase the time of immersion up to as long as 15 minutes. The time of immersion for acceptable peel removal of any particular edible plant product is dependent upon such factors as the ripeness of the edible plant product and the concentration of the lye solution. However, for most situations, the preferred immersion time is between 10 seconds and 10 minutes.

In order to illustrate this invention, fruits and vegetables were obtained from a produce market and sorted to obtain samples of uniform ripeness and size. The raw products were immersed in a hot lye solution for a set period of time and the peel hand-slipped under running water. The product was first immersed in a lye solution to determine the optimum conditions for removal of 100% of the skin. These optimum conditions were used to show the effectiveness of the addition of the $C_5$–$C_{10}$ fatty acids in reducing the time needed to peel the particular edible plant product.

The following examples illustrate the usage of the invention. These examples are merely representative. They are not intended to limit the invention to the removal of skins of only the fruits and vegetables herein illustrated. The process of this invention includes the removal of skins from any edible plant product as further defined in the appended claims.

Tables 1, 2, and 3 show that the addition of a fatty acid or a mixture of fatty acids can significantly reduce the peeling time when the lye concentration and the temperature of the solution are held constant.

TABLE 1.—EFFECT OF FATTY ACID ADDITIVES ON PEELING TIME FOR TOMATOES.

[Solution temperature, 210° F.; Lye Concentration, 18%]

| Additive | Additive Concentration, Weight Percent | Peeling Time (Sec.) | Approximate Peeling Time, Reduction Percent |
| --- | --- | --- | --- |
| None | | 40 | |
| 90% Pelargonic Acid and 10% Pluronic L-61 [1] | 0.03 | 20 | 50 |
| 90% Pelargonic Acid and 10% Pluronic L-61 [1] | 0.27 | 10 | 75 |
| None | | 40 | |
| Mixture of $C_5$–$C_9$ Acids [2] | 0.09 | 30 | 25 |
| Mixture of $C_5$–$C_9$ Acids [2] | 0.27 | 12½ | 69 |

[1] Pluronic L-61 is a trademark of Wyandotte Chemicals Corporation for a nonionic polyoxyethylene-polyoxypropylene block polymer surfactant polyol having a molecular weight of about 2000.
[2] The mixture of acids consisted of 24% pelargonic, 11% caprylic, 38% enanthic, 24 caproic and 3% valeric acids.

TABLE 2.—EFFECT OF FATTY ACID ADDITIVES ON PEELING TIME FOR PIPPIN APPLES

[Solution Temperature, 140° F.; Lye Concentration, 10%]

| Additive | Additive Concentration, Weight Percent | Peeling Time (Min.) | Approximate Peeling Time, Reduction Percent |
| --- | --- | --- | --- |
| None | | 9 | |
| 90% Pelargonic Acid and 10% Pluronic L-61 [1] | 0.09 | 8 | 11 |
| 90% Pelargonic Acid and 10% Pluronic L-61 [1] | 0.27 | 6 | 33 |
| None | | 10 | |
| Mixture of $C_5$–$C_9$ Acids [2] | 0.09 | 9 | 10 |
| Mixture of $C_5$–$C_9$ Acids [2] | 0.54 | 6 | 40 |

[1] See footnote 1 to Table 1.
[2] See footnote 2 to Table 1.

TABLE 3.—EFFECT OF FATTY ACID ADDITIVES ON PEELING TIME FOR D'ANJOU PEARS

[Solution Temperature, 140° F.; Lye Concentration, 10%]

| Additive | Additive Concentration, Weight Percent | Peeling Time (Min.) | Approximate Peeling Time, Reduction Percent |
|---|---|---|---|
| None | | 7 | |
| 90% Pelargonic Acid and 10% Pluronic L-61 [1] | 0.09 | 5.5 | 21 |
| 90% Pelargonic Acid and 10% Pluronic L-61 [1] | 0.27 | 4 | 43 |
| None | | 8 | |
| Mixture of $C_5$-$C_9$ Acids [2] | 0.03 | 5 | 39 |
| Mixture of $C_5$-$C_9$ Acids [2] | 0.54 | 4 | 50 |

[1] See footnote 1 to Table 1.
[2] See footnote 2 to Table 1.

Table 4 shows that the lye concentration may be materially reduced when a fatty acid additive is introduced into the lye solution.

TABLE 4.—EFFECT OF FATTY ACID ADDITIVE ON McINTOSH APPLE[1] PEELING AT VARYING LYE CONCENTRATIONS

Solution temperature _____° F__ 210 to 220
Concentration of additive _____percent__ 0.27
Immersion time _____seconds__ 60

Additive consisted of 90% pelargonic acid and 10% Pluronic L-61 [a].

Lye concentration: Peeling performance, percent peel removal
- 10% _____ <10
- 10% with additive _____ 100
- 12% _____ <10
- 12% with additive _____ 100
- 14% _____ About 25
- 14% with additive _____ 100
- 18% _____ About 50
- 18% with additive _____ 100

[1] McIntosh apples, U.S. Fancy 2½" min.
[a] See footnote 1 to Table 1.

Table 5 illustrates the use of seven different fatty acids or mixtures of fatty acids on the peeling performance of lye solutions.

lye solution having a lye concentration from about 8 weight percent to about 30 weight percent.

3. The process of claim 1 wherein said solution contains a small amount of a defoaming agent.

4. The process of claim 3 wherein said defoaming agent is a nonionic polyoxyethylene-polyoxypropylene block polymer surfactant polyol.

5. A process for removing skin from fruits and vegetables comprising the steps of contacting said fruits and vegetables with an aqueous alkaline caustic solution containing at least about 0.02 weight percent to about 1.00 weight percent, based on total solution, of a fatty acid selected from the group consisting of capric, pelargonic, caprylic, enanthic, caproic, valeric, 2-ethyl heptanoic, isomers of the foregoing fatty acids and mixtures thereof under conditions of concentration, time and temperature to partially disintegrate the skins of said fruits and vegetables without substantial damage to the remainder of said fruits and vegetables; removing wet fruits and vegetables from contact with said solution; and rinsing said wet fruits and vegetables in water to provide peeled fruits and vegetables.

6. A composition for removing the outer layers of tissue from edible plant products comprising an aqueous solution containing from about 8 to 30 weight percent lye and from about 0.02 to 1.00 weight percent, based

TABLE 5.—PEELING PERFORMANCE OF VARIOUS ACIDS AND MIXTURES THEREOF

| Fatty Acid Additive | Lye Solution | Lye Solution with Additives, Percent | | | | | | |
|---|---|---|---|---|---|---|---|---|
| | | A | B | C | D | E | F | G |
| Mixture of $C_5$-$C_9$ Acids [1] | 100 | | | | | | | |
| Caprylic Acid | | | 75 | 50 | 100 | | 60 | |
| Caproic Acid | | | 25 | 50 | | 100 | 40 | |
| 2-Ethyl Heptanoic Acid | | | | | | | | 100 |
| Apple Peeling Performance: | | | | | | | | |
|   18% Lye Concentration | | | | | | | | |
|   0.27% Fatty Acid Concentration | | | | | | | | |
|   Solution Temperature, 210° F | | | | | | | | |
|   Immersion Time, 60 Sec. | | | | | | | | |
|   Percent Peel Removal | 50 | 100 | 100 | 100 | 100 | 60 | | 100 |
|   10% Lye Concentration | | | | | | | | |
|   0.54% Fatty Acid Concentration | | | | | | | | |
|   Solution Temperature, 150° F | | | | | | | | |
|   Immersion Time, 3 Min. | | | | | | | | |
|   Percent Peel Removal | 30 | 100 | | 100 | | | | |
| Tomato Peeling Performance: | | | | | | | | |
|   18% Lye Concentration | | | | | | | | |
|   0.27% Fatty Acid Concentration | | | | | | | | |
|   Solution Temperature, 170° F | | | | | | | | |
|   Immersion Time, 30 Sec. | | | | | | | | |
|   Percent Peel Removal | 50 | 100 | 100 | 100 | | | 100 | 100 |

[1] See footnote 2 of Table 1.

What is claimed is:

1. A process for removing the outer layers of tissue from an edible plant product comprising contacting said products with an aqueous alkaline caustic solution containing at least about 0.02 weight percent, based on total solution, of a fatty acid of the formula $C_nH_{2n}O_2$ where $n$ is from about 5 to 10.

2. The process of claim 1 wherein said solution is a on total solution, of a fatty acid having from 5 to 10 carbon atoms.

7. The composition of claim 6 wherein said fatty acid is selected from the group consisting of capric, pelargonic, caprylic, enanthic, caproic, valeric, 2-ethyl heptanoic, isomers of the foregoing fatty acids and mixtures thereof.

8. The process of claim 1 wherein said solution is at a temperature in the range of about 130° to 220° F. and wherein said products are in contact with said solution for a period of about 5 seconds to about ten minutes, thereafter removing wet products from contact with said solution and rinsing said wet products in water to provide a peeled edible plant product.

9. The process of claim 1 wherein said fatty acid is selected from the group consisting of pelargonic acid, caprylic acid, caproic acid, 2-ethyl heptanoic acid and mixtures thereof.

10. The process of claim 5 wherein said alkaline caustic solution contains a lye concentration of from about 8 weight percent to about 30 weight percent, wherein said time of contact is from about 5 seconds to about 10 minutes and wherein said temperature is from about 130° F. to about 220° F.

References Cited by the Examiner
UNITED STATES PATENTS 1,887,256 11/1932 Bizzell et al. _____ 146—233
2,792,347 5/1957 Stegemeyer _____ 252—108

OTHER REFERENCES

The Handbook of Soap Manufacture, London, Simmons and Appleton; Scott, Greenwood and Son, 1908. Chapters II and V, pp. 10 and 45. TP 991.S6.

Woodroof et al., Food Industries, June 1948, "Peeling With Lye," pp. 101–108.

WILLIAM W. DYER, JR., *Primary Examiner.*

W. GRAYDON ABERCROMBIE, *Examiner.*